United States Patent

Fleming, III

[11] Patent Number: 6,067,279
[45] Date of Patent: *May 23, 2000

[54] APPARATUS FOR SKIPPING AND/OR PLAYING TRACKS ON A CD OR A DVD

[75] Inventor: Hoyt A. Fleming, III, Boise, Id.

[73] Assignee: Micron Electronics, Inc., Nampa, Id.

[*] Notice: This patent is subject to a terminal disclaimer.

[21] Appl. No.: 08/989,756

[22] Filed: Dec. 12, 1997

[51] Int. Cl.[7] .................................................. G11B 17/22
[52] U.S. Cl. .................................. 369/32; 369/33
[58] Field of Search ................... 369/33, 32, 14, 369/54, 58, 47, 48

[56] References Cited

U.S. PATENT DOCUMENTS

| | | | |
|---|---|---|---|
| 4,677,604 | 6/1987 | Selby, III et al. | 369/33 |
| 4,847,708 | 7/1989 | Furuyama | 369/32 |
| 4,872,151 | 10/1989 | Smith | 369/14 |
| 5,282,187 | 1/1994 | Lee | 369/14 |
| 5,457,669 | 10/1995 | Kim et al. | 369/32 |
| 5,646,920 | 7/1997 | Raczynski | 369/33 |
| 5,870,364 | 2/1999 | Raczynski | 369/33 |

*Primary Examiner*—Tan Dinh
*Attorney, Agent, or Firm*—Park & Vaughan

[57] ABSTRACT

One embodiment of the present invention provides a system for skipping a track on a disc in a disc player. Unlike current systems, this system does not rely on identifying tracks to be skipped based upon which slot a disc is located in. Instead, one embodiment of the present invention identifies discs based upon identification data read from discs in the disc player. Thus, one embodiment of the present invention provides an apparatus for playing discs that skips a track on a disc. The apparatus includes a disc player including a sequencing mechanism that generates a sequence of tracks from discs in the disc player. The disc player also includes an identification mechanism within the disc player that reads identification information from discs in the disc player and determines from the identification information if a specific disc is in the disc player. The disc player additionally includes a skipping mechanism within the disc player that skips a specific track if the specific track occurs in the sequence of tracks.

17 Claims, 5 Drawing Sheets

APPARATUS FOR SKIPPING AND/OR PLAYING TRACKS ON A CD OR A DVD

RELATED APPLICATION

The subject matter of this application is related to the subject matter in a co-pending non-provisional application, Ser. No. 08/990,055, by the same inventors as the instant application and filed on the same day, Dec. 12, 1997, as the instant application entitled, "Method for Skipping and/or Playing Tracks on a CD or a DVD," (Attorney Docket No. MEI-97-03270.01).

BACKGROUND

1. Field of the Invention

The present invention relates systems for retrieving and playing pre-recorded audio data, and more specifically to a method and an apparatus for skipping tracks or playing tracks from discs in a compact disc (CD) player or a digital video disc (DVD) player.

2. Related Art

Many compact disc players allow a user to play a sequence of tracks from one or more compact discs stored in the compact disc player. This sequence can cycle through tracks from the compact disks in a number of ways, including randomly, sequentially or in a pre-specified sequence.

However, a user of a compact disc player often prefers not to listen to certain tracks on certain CDs, because the user finds these tracks unappealing, boring or distasteful. Sony Corporation produces a 200-disc MegaStorage CD changer (model number CDP-CX255) that provides a limited ability to skip certain tracks. The MegaStorage CD changer can be programmed to skip selected tracks of a CD that is located in a particular slot in the MegaStorage CD changer.

This solution is far from optimal because CDs can be moved or removed from the CD changer. For example, suppose a particular CD is placed in the fifth slot in the MegaStorage CD changer and the changer is programmed to skip the third track of the fifth slot. If another CD is placed in the fifth slot, the third track of the CD contained in the fifth slot will be also be skipped. Hence, when a user inserts a new CD into the MegaStorage changer, the user may be forced to reprogram the changer.

The same problem is encountered for users who preprogram a sequence of tracks to be played from a CD changer. For example, suppose a CD changer is programmed to play the third track from a CD that is placed in the fifth slot in the CD changer. If another CD is placed in the fifth slot, the third track of that CD will be played instead of the third track of the original disc. Again, when a user inserts a new CD in the CD changer, the user may be forced to reprogram the changer.

What is needed is a method and an apparatus for skipping tracks on CDs in a CD changer that does not rely on programming the CD changer to skip tracks from specific slots in the CD changer.

Additionally what is needed is a method and an apparatus for programming tracks to be played from CDs in a CD changer that does not rely on programming the CD changer to play tracks from specific slots in the CD changer.

SUMMARY

One embodiment of the present invention provides a system for skipping a track on a disc in a disc player. Unlike current systems, this system does not rely on identifying tracks to be skipped based upon which slot a disc is located in. Instead, one embodiment of the present invention identifies discs based upon identification data read from discs in the disc player. Thus, one embodiment of the present invention provides an apparatus for playing discs that skips a track on a disc. The apparatus includes a disc player including a sequencing mechanism that generates a sequence of tracks from discs in the disc player. The disc player also includes an identification mechanism within the disc player that reads identification information from discs in the disc player and determines from the identification information if a specific disc is in the disc player. The disc player additionally includes a skipping mechanism within the disc player that skips a specific track if the specific track occurs in the sequence of tracks.

In one embodiment of the present invention the disc player includes an audio compact disc player. In another embodiment, the disc player includes a digital video disc (DVD) player. In yet another embodiment of the present invention, the disc player includes an audio cassette player. In a further embodiment of the present invention, the disc player is part of a computer system. In another embodiment, the disc player is part of an audio system.

One embodiment of the present invention includes an input mechanism in the disc player that receives an input specifying a specific track to be skipped from the specific disc.

Another embodiment includes a memory storage device that stores information specifying the specific track to be skipped from the specific disc.

In another embodiment of the present invention, the identification mechanism includes a mechanism that reads disc identification data from a memory storage device, wherein the disc identification data identifies the discs contained in the disc player. In another embodiment, the identification mechanism includes a sampling mechanism that reads audio data from the discs in the disc player. It also includes an identifier construction mechanism that uses the audio data to construct identifiers for the discs. In another embodiment, the identification mechanism includes a mechanism that reads identification labels from discs in the disc player.

In another embodiment of the present invention, the sequencing mechanism includes a mechanism that plays a random sequence of tracks from discs in the disc player. In another embodiment, the sequencing mechanism includes a mechanism that plays a pre-specified sequence of tracks. In another embodiment, the sequencing mechanism includes a mechanism that plays tracks in sequential order.

Another embodiment of the present invention, includes a labeling mechanism within the disc player that assigns a label to a disc in the disc player. This labeling mechanism includes: a sampling mechanism that reads audio data from the disc; an identifier construction mechanism that uses the audio data to construct an identifier for the disc; a label input device that receives a label for the disc from a system user; and an associating mechanism that associates the label with the identifier for the disc.

Another embodiment of the present invention includes a mechanism within the disc player that prompts a user to insert a disc in the disc player if the sequence of tracks includes a track from the disc and the disc is missing from the disc player.

DEFINITIONS

Disc player—an apparatus that reads the contents of a disc, and outputs the contents to an output device, such as an audio speaker. A disc player includes, but is not limited to, an audio compact disc player, and a digital video disc player. It also includes other devices for reproducing audio signals, including a record player and a cassette tape player.

Memory storage device—a storage device for data. This includes, but is not limited to, magnetic, optical, magneto-optical, and flash memory devices, as well as battery-backed up random access memory. It also includes random access memory without battery back up.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Audio System Embodiment

Figure 1:
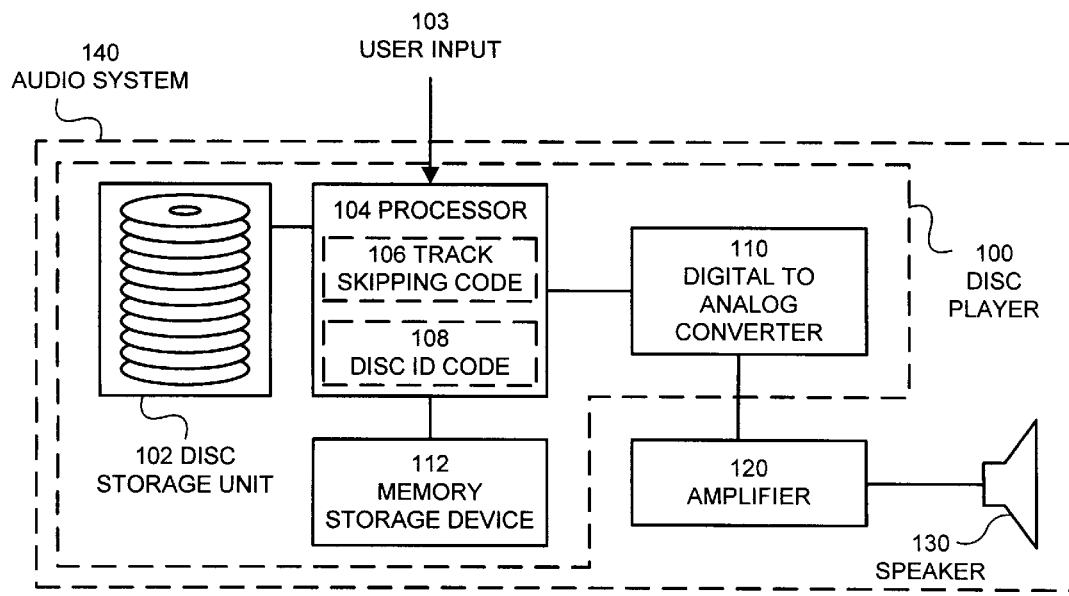
FIG. 1 illustrates a disc player 100 that is part of an audio system 140 in accordance with an embodiment of the present invention.

FIG. 1 illustrates a disc player 100 that is part of an audio system 140 in accordance with an embodiment of the present invention. Disc player 100 includes disc storage unit 102, processor 104, memory storage device 112 and digital to analog converter 110.

Disc storage unit 102 is an apparatus that stores at least one disc containing audio data. In general, "discs" containing audio data can be any type of storage media for audio data. This includes, but is not limited to audio compact discs (CDs), digital video discs (DVDs), phonograph records and audio cassette tapes. In one embodiment disc storage unit 102 has room for multiple discs which are stored in "slots" in disc storage unit 102.

Disc storage unit 102 is coupled to processor 104 and operates under control of processor 104. Processor 104 may be any type of computing or control device. This includes, but is not limited to, a microprocessor, a device controller and a hardwired controller. Processor 104 contains track skipping code 106, for skipping tracks while playing discs from disc storage unit 102. Processor 104 additionally includes disc ID code 108, for determining the identity of discs stored in disc storage unit 102.

Processor 104 is additionally coupled to memory storage device 112. Memory storage device 112 may be any storage device for data. This includes, but is not limited to, magnetic, optical, magneto-optical, and flash memory devices. It also includes battery-backed up random access memory and random access memory without battery back up.

Processor 104 is also coupled to digital-to-analog converter 110, which converts digital signals from discs within disc storage unit 102 into analog signals for output to other components within audio system 140. In some embodiments of the present invention, disc storage unit 102 contains data in analog form, such as on audio cassette tapes. In these embodiments, no digital-to-analog converter is included. The output of digital-to-analog converter 110 feeds through amplifier 120 for output through speaker 130.

The embodiment illustrated in FIG. 1 operates as follows. Processor 104 receives user input 103 specifying tracks to be skipped from discs within disc storage unit 102. Processor 104 stores identifiers for these tracks to be skipped to memory storage device 112. Processor 104 reads information from discs within disc storage unit 102 to determine which discs are present within disc storage unit 102. Processor 104 then plays a sequence of tracks from disc storage unit 102 skipping the specified tracks to be skipped. Tracks are played by outputting them through digital-to-analog converter 110 into amplifier 120. Audio signals from amplifier 120 are outputted through speaker 130.

In another embodiment of the present invention, disc storage unit 102 stores a single disc. In this embodiment, processor 104 reads information from the single disc to determine the identity of the single disc. Processor 104 then plays a sequence of tracks from the single disc, skipping the specified tracks to be skipped.

Description of Computer System Embodiment

Figure 2:
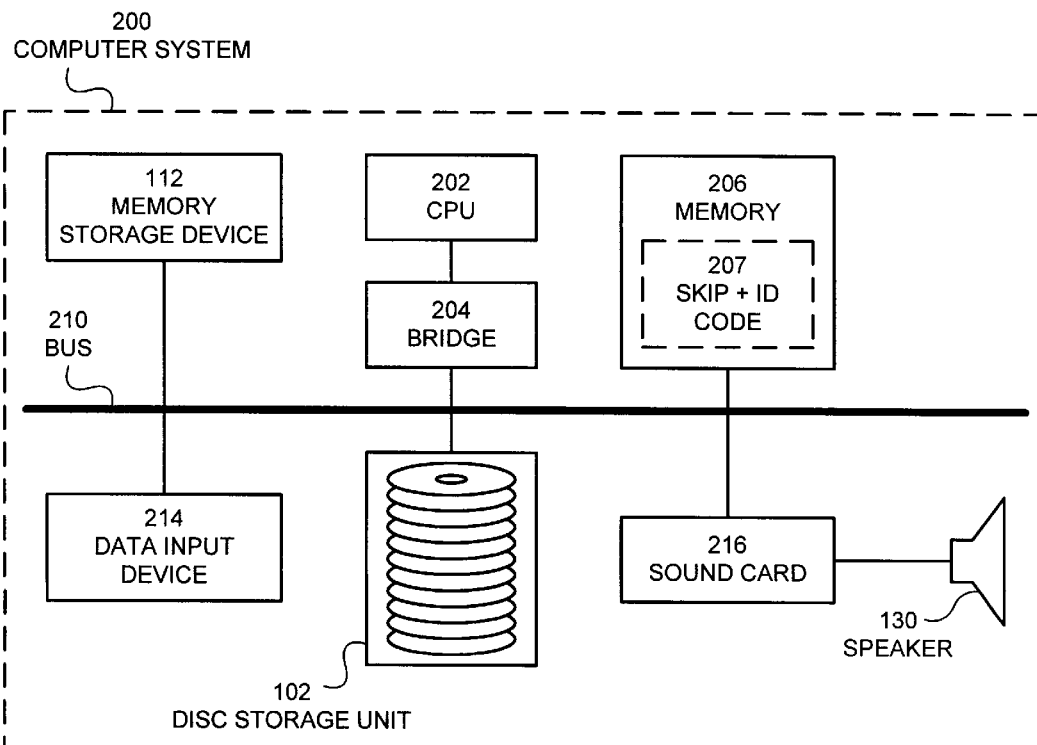
FIG. 2 illustrates a disc storage unit 102 that is part of a computer system 200 in accordance with an embodiment of the present invention.

FIG. 2 illustrates a disc storage unit 102 that is part of a computer system 200 in accordance with an embodiment of the present invention. In this embodiment, disc storage unit 102 is coupled to bus 210 within computer system 200. Disc storage unit 102 operates under control of central processing unit (CPU) 202, which is coupled to bus 210 through bridge 204. CPU 202 may be any type of central processing unit for a computer system. This includes, but is not limited to, a microprocessor, a device controller and even a central processing unit for a mainframe computer. Bridge 204 is a component within computer system 200 that couples CPU 202 to a bus, such as bus 210. Bridge 204 also couples CPU 202 to a memory, such as memory 206.

Memory 206 can be any type of memory that can store code and data operated on by CPU 202. Memory 206 includes code for performing track skipping and disc identification functions 207 for discs within disc storage unit 102.

Bus 210 is additionally coupled to memory storage device 112. Memory storage device 112 may be any storage device for data. This includes, but is not limited to, magnetic, optical, magneto-optical, and flash memory devices. It also includes battery-backed up random access memory and random access memory without battery back up.

Bus 210 is also coupled to data input device 214. Data input device 214 may be any type of device for taking input from a user of the computer system. This includes, but is not limited to, devices such as a keyboard, a mouse, a glide point, a track ball, and a microphone.

Bus 210 is additionally coupled to sound card 216, which contains circuitry for processing audio signals. Sound card 216 is coupled to speaker 130, through which sound card 216 outputs audio signals.

The embodiment illustrated in FIG. 2 operates as follows. CPU 202 receives user input through data input device 214. This user input specifies tracks to be skipped from discs within disc storage unit 102. CPU 202 stores identifiers for these tracks to be skipped to memory storage device 112. CPU 202 then reads information from discs within disc storage unit 102 to determine which discs are present within disc storage unit 102. CPU 202 then commands disc storage unit 102 to play a sequence of tracks skipping the specified tracks to be skipped. When tracks are played they are outputted through sound card 216 and speaker 130.

In another embodiment of the present invention, disc storage unit 102 stores a single disc. In this embodiment, CPU 202 reads information from the single disc to determine the identity of the single disc. CPU 202 then plays a sequence of tracks from the single disc, skipping the specified tracks to be skipped.

Description of Software Architecture of One Embodiment

Figure 3:
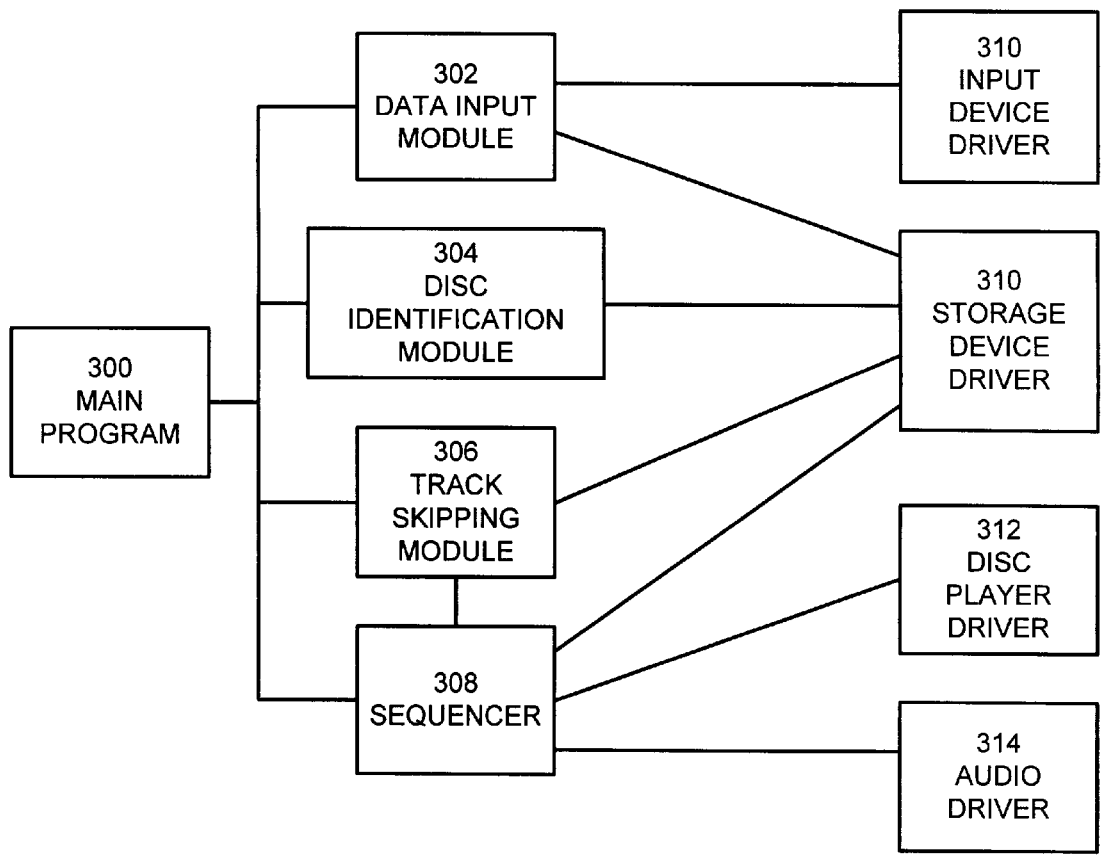
FIG. 3 is a high-level block diagram of a software architecture for a system that skips tracks on discs in a disc player in accordance with an embodiment of the present invention.

FIG. 3 is a high-level block diagram of a software architecture for a system that skips tracks on discs in a disc player in accordance with an embodiment of the present invention. This software architecture may be applied to either of the hardware embodiments illustrated in FIGS. 1 and 2. In the hardware embodiment illustrated in FIG. 1, the software architecture can run on processor 104. In the hardware embodiment illustrated in FIG. 2, the software architecture can run on CPU 202.

The embodiment of the software architecture illustrated in FIG. 3 includes main program 300, which controls the operation of other software modules in the system. Main program 300 is coupled to a number of other modules, including data input module 302, disc identification module 304, track skipping module 306 and sequencer module 308.

Data input module 302 controls and coordinates the inputting of data into the system. Data input module 302 is coupled to input device driver 309 and storage device driver 310. Input device driver 309 is coupled to an input device for receiving user input. This can include input devices such as a keyboard, a mouse or input buttons. During operation, data input module 302 receives input from input device driver 309. This input may be used to control operations of the system. Alternatively, the input can be stored in memory storage device 112 through storage device driver 310. For example, data input module 302 can receive input specifying tracks to be skipped through input device driver 309. It can then store information about these tracks to be skipped in memory storage device 112 through storage device driver 310.

Disc identification module 304 is coupled to storage device driver 310 and performs operations to identify discs that are present in disc storage unit 102. Disc identification module 304 sends commands to storage device driver 310 to read identification data from the discs within disc storage unit 102. In one embodiment, disc identification module 304 identifies a disc by taking a sample of audio data from the disc and using this sample to construct an identifier for the disc. In another embodiment, disc identification module 304 reads a pre-existing identification label encoded on the disc, and uses this pre-existing label to identify the disc.

Track skipping module 306 is coupled to sequencer 308 and disc player driver 312. Track skipping module 306 monitors a track to be played by sequencer 308 and looks up the track to be played in memory storage device 112 to determine if the track should be skipped. If the track matches a track to be skipped, track skipping module 306 commands sequencer 308 to skip the track. Otherwise, sequencer 308 plays the track without interference from track skipping module 306.

Sequencer 308 generates a sequence of tracks to be played from discs within disc storage unit 102. Sequencer 308 is coupled to storage device driver 310, disc player driver 312 and audio driver 314. In one embodiment, sequencer 308 retrieves a sequence of tracks from memory storage device 112, and plays the sequence of tracks by commanding disc player driver 312 and audio driver 314 appropriately. In another embodiment, sequencer 308 includes a random number generator. It uses this random number generator to generate a random sequence of tracks to be played. In yet another embodiment, sequencer 308 plays tracks from discs within disc storage unit 102 in sequential order.

Description of Operation

Figure 4:
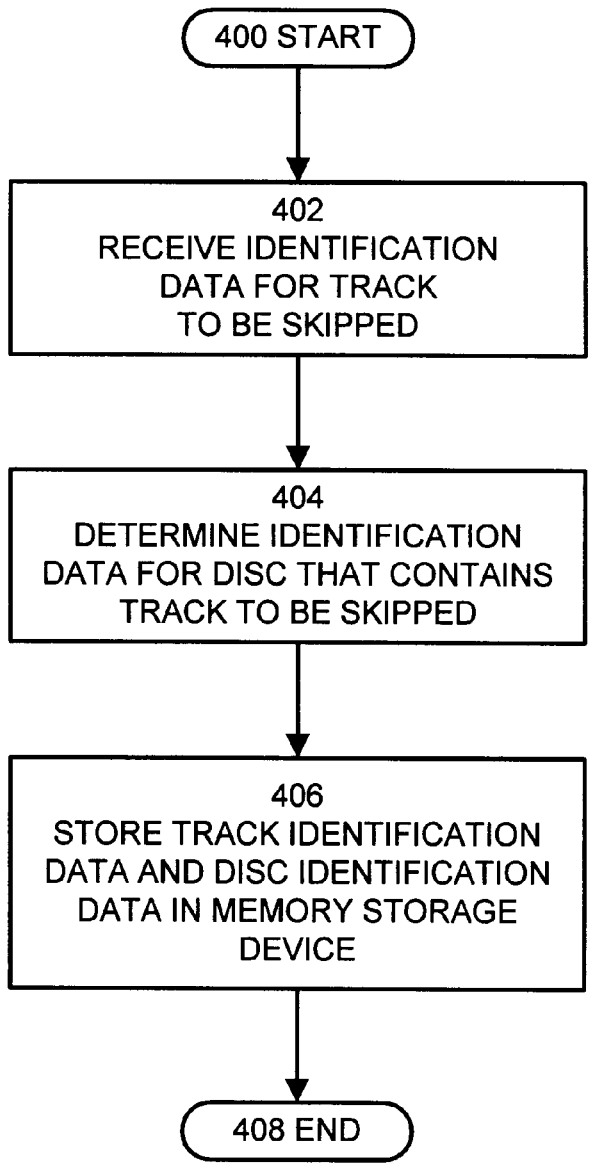
FIG. 4 is a flow chart illustrating a method for storing tracks to be skipped in accordance with an embodiment of the present invention.

FIG. 4 is a flow chart illustrating a method of storing tracks to be skipped from a disc in accordance with an embodiment of the present invention. The system starts in state 400 and proceeds to state 402. In state 402, the system receives identification data for tracks to be skipped. In one embodiment, this identification data is received from a human user through a user interface. The system next proceeds to state 404. In state 404, the system determines identification data for the disc that contains the track to be skipped. In one embodiment, this identification data is determined by sampling audio data from the disc and using this audio data to construct an identifier for the disc. The system next proceeds to state 406. In state 406, the system stores the track identification data and the disc identification data to memory storage device 112. The system then proceeds to state 408, which is an end state.

Figure 5:
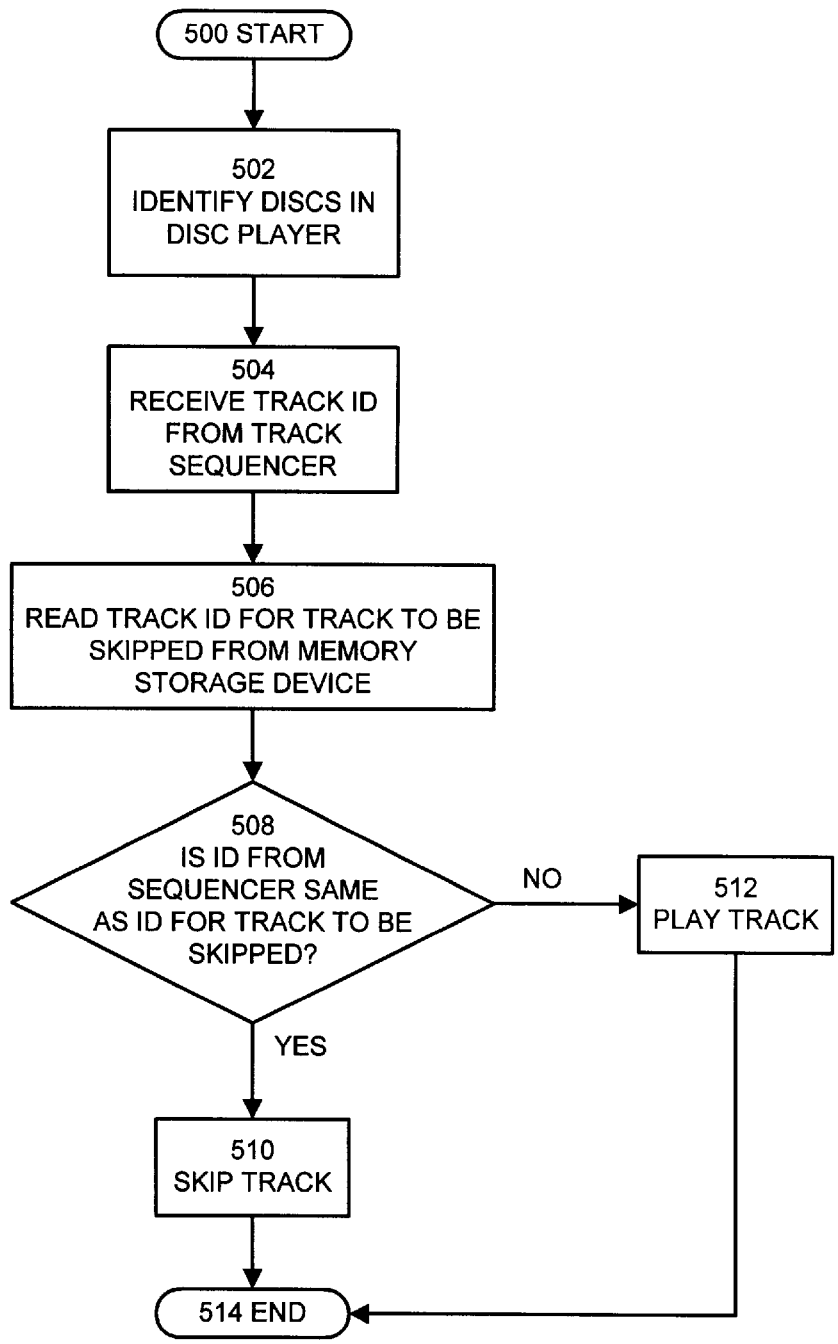
FIG. 5 is a flow chart illustrating a method of skipping a track on a disc in a disc player in accordance with an embodiment of the present invention.

FIG. 5 is a flow chart illustrating a method of skipping a track on a disc in a disc player in accordance with an embodiment of the present invention. The system starts in state 500 and proceeds to state 502. In state 502, the system identifies discs in the disk player. In one embodiment, this is accomplished by sampling audio data from the discs, and using this audio data to construct identifiers for the discs. These identifiers are compared with identifiers stored in memory storage device 112 to determine the identity of the disc. In another embodiment, a pre-existing identification label is read from the discs. The system then proceeds to state 504. In state 504, the system receives a track identifier from sequencer 308. This track identifier specifies a next track to be played. The system then proceeds to state 508. In state 508, the system determines whether the next track to be played matches any of the tracks to be skipped. If so, the system proceeds to state 510, in which the next track to be played is skipped. The system the proceeds to state 514, which is an end state. If not, the system proceeds to state 512, in which the track is played. The system then proceeds to state 514, which is an end state.

Figure 6:
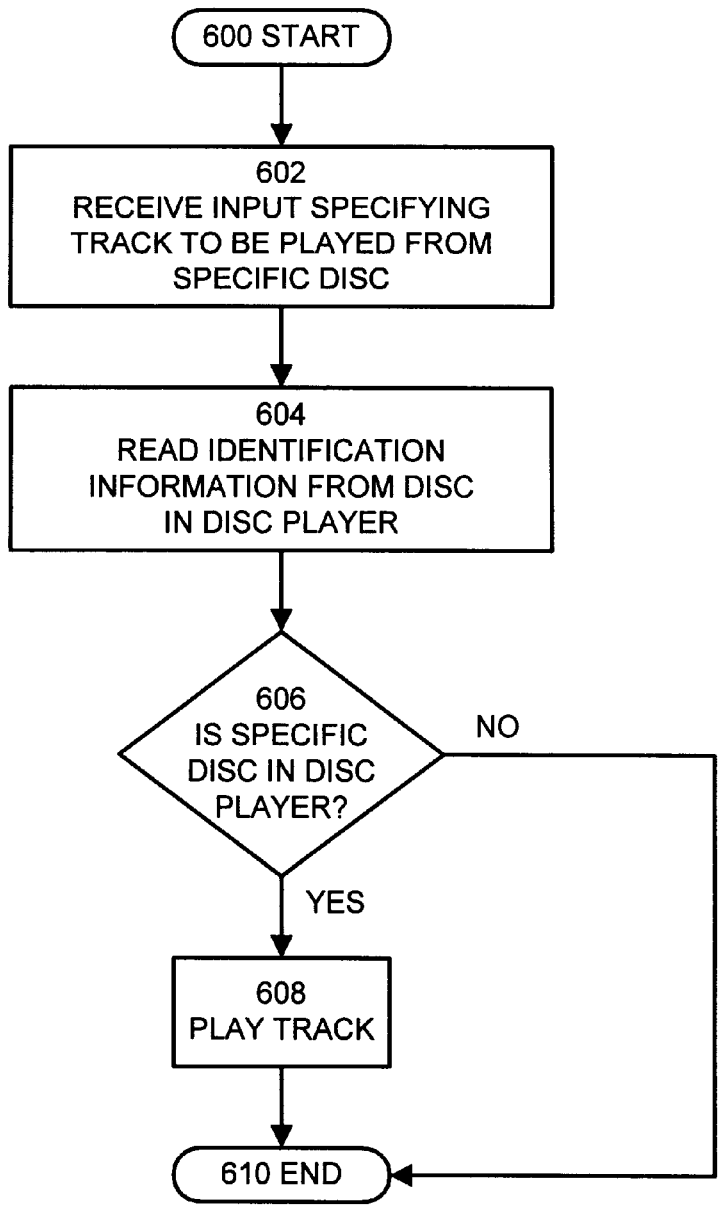
FIG. 6 is a flow chart illustrating a method of playing a track from a disc in a disc player in accordance with an embodiment of the present invention.

FIG. 6 is a flow chart illustrating a method of playing a track from a disc in a disc player in accordance with an embodiment of the present invention. Unlike other methods which identify tracks based upon a slot number and a track number, this method identifies a track by reading information from discs contained in the disc player. This information is used to determine which discs are present in the disc player and where they are located in the disc player. The disc player then plays a specified track using this identification and location information. The system starts in state 600 and proceeds to state 602. In state 602, the system receives input specifying a track to be played from a specific disc. The system then proceeds to state 604. In state 604, the system reads identification information from disks within the disc player to determine which disks are present in the disc player. The system then proceeds to state 606. In state 606, the system determines whether the specific disc containing the track to be played is located in the disc player. If, so the system proceeds to state 608 in which the track is played. The system then proceeds to state 610, which is an end state. If not, the system proceeds directly to end state 610. In another embodiment, if the disc is not present in the disc player, the system prompts to user to insert the specific disc into the disk player.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

CONCLUSION

The present invention allows a user to program a disc player/changer so that the disc player/changer will skip a track on a particular disc regardless of (1) whether the disc is removed from the player/changer and then re-inserted, or (2) whether the disc is placed in a different slot in the player/changer. Thus, the user will not have the reprogram the player/changer every time a disc is removed from the player/changer or moved within the player/changer. Hence, the present invention will decrease the amount of programming required to operate the player/changer. It will additionally ensure that no unwanted tracks are played and no wanted tracks are skipped.

What is claimed is:

1. A disc player that accommodates a plurality of discs, comprising:

a disc player;

a sequencing mechanism within the disc player that generates a sequence of tracks to be played by the disc player;

an input mechanism that receives an identifier for a track to be skipped from a user, the identifier specifying a disc from the plurality of discs and a track to be skipped from the disc:

a disc identification mechanism within the disc player that reads identification information from the plurality of discs in the disc player and determines from the identification information if the disc is contained in the disc player; and a skipping mechanism within the disc player that compares the identifier for the track to be skipped with the sequence of tracks generated by the sequencing mechanism and skips the track to be skipped if the track to be skipped occurs in the sequence of tracks.

2. The disc player of claim 1, including a memory storage device that stores the identifier for the track to be skipped.

3. The disc player of claim 1, wherein the disc player includes an audio compact disc player.

4. The disc player of claim 1, wherein the disc player includes a digital video disc player.

5. The disc player of claim 1, wherein the disc player includes an audio tape player.

6. The disc player of claim 1, wherein the disc identification mechanism includes a mechanism that reads disc identification data from a memory storage device, the disc identification data identifying the plurality of discs contained in the disc player.

7. The disc player of claim 1, wherein the disc identification mechanism includes:

a sampling mechanism that reads audio data from a sampled disc from the plurality of discs; and an identifier construction mechanism that uses the audio data to construct an identifier for the sampled disc.

8. The disc player of claim 1, wherein the identification mechanism includes a mechanism that reads identification labels from the plurality of discs.

9. The disc player of claim 1, wherein the sequencing mechanism includes a mechanism that plays a random sequence of tracks from the plurality of discs.

10. The disc player of claim 1, wherein the sequencing mechanism includes a mechanism that plays a pre-specified sequence of tracks from the plurality of discs.

11. The disc player of claim 1, wherein the sequencing mechanism includes a mechanism that plays tracks in sequential order from the plurality of discs.

12. The disc player of claim 1, further comprising a labeling mechanism within the disc player that assigns a label to a disc from the plurality of discs, comprising:

a sampling mechanism in communication with the disc that reads audio data from the disc;

an identifier construction mechanism in communication with the sampling mechanism that uses the audio data to construct an identifier for the disc;

a label input device that receives a label for the disc from a user; and an associating mechanism that associates the label with the identifier for the disc.

13. The disc player of claim 1, including a mechanism within the disc player that prompts a user to insert a disc in the disc player if the sequence of tracks includes a track from the disc and the disc is missing from the disc player.

14. A disc player that accommodates a plurality of discs, comprising:

a disc player for audio compact discs;

an input mechanism that receives an identifier for a track to be skipped from a user, the identifier specifying a disc from the plurality of discs and a track to be skipped from the disc;

a memory storage device within the disc player that stores the identifier for the track to be skipped;

a sampling mechanism within the disc player that reads audio data from the plurality if discs;

an identifier construction mechanism within the disc player that uses the audio data to construct an identifier for the plurality of discs;

an identification mechanism within the disc player that determines from the identifier if the disc containing the track to be skipped is in the disc player;

a sequencing mechanism within the disc player that plays a sequence of tracks from the plurality of disks; and a skipping mechanism within the disc player that compares the identifier for the track to be skipped with the sequence of tracks generated by the sequencing mechanism and skips the track to be skipped if the track to be skipped occurs in the sequence of tracks.

15. A system that plays discs, comprising:

a disc player that accommodates a plurality of discs:

a sequencing mechanism within the disc player that generates a sequence of tracks to be played by the disc player;

an input mechanism that receives an identifier for a track to be skipped from a user, the identifier specifying a disc from the plurality of discs and a track to be skipped from the disc;

a disc identification mechanism within the disc player that reads identification information from the plurality of disks in the disc player and determines from the identification information if the disc is contained in the disc player; and a skipping mechanism within the disc player that compares the identifier forthe track to be skipped with the sequence of tracks generated by the sequencingmechanism and skips the track to be skipped if the track to be skipped occurs in the sequence of tracks.

16. The system of claim 15, wherein the system includes a computer system.

17. The system of claim 15, wherein the system includes an audio system.

* * * * *